(12) United States Patent
Nystad

(10) Patent No.: US 10,559,055 B2
(45) Date of Patent: Feb. 11, 2020

(54) GRAPHICS PROCESSING SYSTEMS

(71) Applicant: ARM Limited, Cambridge (GB)

(72) Inventor: Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/218,016

(22) Filed: Jul. 23, 2016

(65) Prior Publication Data

US 2017/0032489 A1 Feb. 2, 2017

(30) Foreign Application Priority Data

Jul. 31, 2015 (GB) .................................. 1513611.2

(51) Int. Cl.
*G06T 1/20* (2006.01)
*G06T 15/00* (2011.01)

(52) U.S. Cl.
CPC ...................................... *G06T 1/20* (2013.01)

(58) Field of Classification Search
CPC ........... G06T 1/20; G06T 1/60; G06T 15/005; G06T 15/80; G06T 2210/52
See application file for complete search history.

(56) References Cited

U.S. PATENT DOCUMENTS

| 4,825,355 A | 4/1989 | Kurakazu |
| 6,449,712 B1 * | 9/2002 | Irie ..................... G06F 9/30058 703/26 |
| 6,499,046 B1 | 12/2002 | Nguyen |
| 7,398,347 B1 | 7/2008 | Pechanek et al. |
| 9,092,215 B2 | 7/2015 | Grisenthwaite et al. |
| 2003/0126520 A1 | 7/2003 | Knight |
| 2004/0186981 A1 | 9/2004 | Christie |
| 2005/0015574 A1 | 1/2005 | Huang |

(Continued)

FOREIGN PATENT DOCUMENTS

| CN | 1147306 | 4/1997 |
| GB | 2349252 | 10/2000 |

(Continued)

OTHER PUBLICATIONS

Combined Search and Examination Report dated Feb. 26, 2016 in Great Britain Application No. GB1513611.2.

(Continued)

*Primary Examiner* — Phuc N Doan
(74) *Attorney, Agent, or Firm* — Vierra Magen Marcus LLP

(57) ABSTRACT

A programmable execution unit of a graphics processor that executes program instructions to perform graphics shading operations can use at least two different register file mapping configurations for mapping registers to execution threads. When a shader program is to be executed, how the shader program will use the registers is considered and the register file mapping configuration to use for the shader program is then selected based on the assessment of the register use by the shader program.
Appropriate state information is then set to cause the threads being executed by the programmable execution unit to use the registers according to the selected register file mapping configuration when executing the shader program.

19 Claims, 7 Drawing Sheets

(56) References Cited

U.S. PATENT DOCUMENTS

| | | | |
|---|---|---|---|
| 2005/0188182 A1* | 8/2005 | Hoyle | G06F 9/30032 |
| | | | 712/224 |
| 2006/0012603 A1 | 1/2006 | Lindholm et al. | |
| 2006/0107076 A1 | 5/2006 | Duncan | |
| 2006/0206646 A1 | 9/2006 | Shrivastava | |
| 2008/0046697 A1 | 2/2008 | Sugure | |
| 2008/0074433 A1* | 3/2008 | Jiao | G06T 15/005 |
| | | | 345/522 |
| 2009/0055631 A1* | 2/2009 | Burky | G06F 9/3838 |
| | | | 712/216 |
| 2009/0085919 A1* | 4/2009 | Chen | G06F 8/441 |
| | | | 345/520 |
| 2009/0089553 A1 | 4/2009 | Bybell | |
| 2012/0110305 A1 | 5/2012 | Lien | |
| 2013/0042090 A1* | 2/2013 | Krashinsky | G06F 9/3016 |
| | | | 712/214 |
| 2014/0122841 A1* | 5/2014 | Abernathy | G06F 9/3012 |
| | | | 712/225 |
| 2014/0122842 A1* | 5/2014 | Abernathy | G06F 9/3012 |
| | | | 712/225 |
| 2015/0154022 A1* | 6/2015 | Khot | G06F 9/30123 |
| | | | 712/217 |
| 2015/0242212 A1* | 8/2015 | Sudhakar | G06F 9/30112 |
| | | | 712/210 |
| 2016/0092231 A1* | 3/2016 | Chu | G06F 9/3836 |
| | | | 712/214 |

FOREIGN PATENT DOCUMENTS

| | | |
|---|---|---|
| GB | 2478726 A | 9/2011 |
| GB | 2522290 A | 7/2015 |
| TW | 200949825 | 12/2009 |
| WO | WO 2011/114125 | 9/2011 |

OTHER PUBLICATIONS

SuperH (SH) 64-bit RISC Series SH-5 CPU Core, vol. 1: Architecture, Feb. 2002, pp. i-344.

SuperH (SH) 64-bit RISC Series SH-5 CPU Core, vol. 3: SHcompact, Feb. 2002, pp. i-276.

Iftode et al. (Scylla: A Smart Virtual Machine for Mobile Embedded Systems, Dec. 2000, pp. 41-50).

SuperH, Inc. "SuperHTM (SH) 64-Bit RISC Series, SH-5 CPU Core" Feb. 2002, vol. 1: "Architecture" pp. 13-50,57,64, 169, 189-191, vol. 3 "SHcompact" pp. 1-10,34,67, 134,233,243.

M. Schlett et ai, "The architecture of the SH-5links the future and the past" Electronic Engineering, Feb. 2000., pp. 22, 24, 26, 29, 31, 33.

English translation of Chinese Office Action dated Aug. 20, 2014 in CN 201180014383.2, 15 pages.

Taiwan Office Action and Search Report dated Oct. 14, 2014 in TW 100108781 and English translation, 28 pages.

Japanese Office Action dated Jun. 9, 2014 in JP 2012-557603 and English translation, 39 pages.

SuperH, Inc., "SuperHTM (SH) 64-Bit RISC Series, SH-5 CPU Core, vol. 1: Architecture" Feb. 2002, pp. 1-7, 13-30,64-65,189-191.

SuperH, Inc., "SuperHTM (SH) 64-Bit RISC Series, SH-5 CPU Core, vol. 3: SHcompact" Feb. 2002, pp. 1-10,67-68, 134-135,233,243.

T. Onuki et ai, "SuperH processor" second edition, Aug. 2000, pp. 98-100, 122-123, 186-193,204-205.

A. Nakamori, "Interface extra edition TECH I vo. 20 Introduction of Microprocessorl Architecture" first edition, Apr. 2014, pp. 179-180.

P. Gomes et ai, Hitachi and ST Microelectronics Ltd."The SH-5 Architecture" Oct. 1999, pp. 1-13.

Chinese Second Office Action dated Mar. 23, 2015 in CN 201180014383.2 and English translation, 20 pages.

Search Report for UK Patent Application No. GB1004293.5 dated Jul. 14, 2010.

S.B. Furber, "VLSI RISC Architecture and Organization" Jan. 1989, pp. 111-117,244-250.

IBM "z/Architecture Principles of Operation" Feb. 2009, pp. viii-x, 1-1 to 1-5,2-3 to 2-4, 4-57 to 4-61,7-6 to 710.

Written Opinion of the International Searching Authority for PCT GB2011 050306, dated Jun. 22, 2011.

International Search Report for PCT GB2011 050306, dated Jun. 22, 2011.

International Preliminary Report on Patentability for PCT GB2011 050306, dated Sep. 18, 2012.

* cited by examiner

GRAPHICS PROCESSING SYSTEMS

BACKGROUND

The technology described herein relates to graphics processors, and in particular to the mapping of threads to registers when executing graphics shader programs.

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately shaded and rendered fragment data in the case of a fragment shader) for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated, such as a render target, e.g. frame (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each "item" will be processed by means of an execution thread which will execute the shader program in question for the graphics "item" in question.

A graphics shader program that is executed by a shading stage of a graphics processing pipeline will typically perform a sequence of instructions that read data from and write data to respective registers. Each execution thread for which the shader program is executed will typically have an allocated register or set of registers that it will read and write its respective data to and from. The registers for this purpose will typically be organised into one or more banks of registers, and respective threads will be allocated registers from a respective bank or banks of the register banks for their use.

Typically there will be a predefined register file mapping that will map the registers in the register bank or banks to respective execution threads, and the execution threads will then use the registers that they have been allocated according to the register file mapping when they execute the shader program in question.

The Applicants believe that there remains scope for improvements to the mapping of execution threads to registers when executing shader programs in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
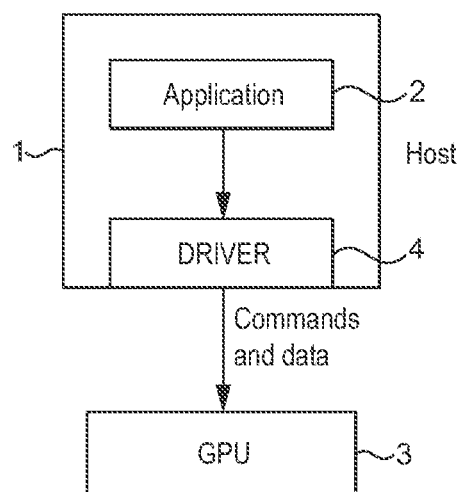
FIG. 1 shows an exemplary computer graphics processing system.

A first embodiment of the technology described herein comprises a method of operating a graphics processing unit that includes a programmable execution unit that executes program instructions to perform graphics shading operations, and a plurality of registers, distributed across at least two register banks, for use by execution threads being executed by the programmable execution unit; and wherein:

the graphics processing unit can use at least two different register file mapping configurations for mapping the registers to execution threads;

the method comprising:

determining for a set of instructions to be executed for a set of threads in the programmable execution unit of the graphics processing unit, which of the at least two different register file mapping configurations to use for the set of instructions for the set of threads; and using the registers according to the determined register file mapping configuration when executing the set of instructions for the set of threads.

A second embodiment of the technology described herein comprises a graphics processing system comprising:

a graphics processing unit comprising:

a programmable execution unit that executes program instructions to perform graphics shading operations; and a plurality of registers, distributed across at least two register banks, for use by execution threads being executed by the programmable execution unit;

wherein:

the graphics processing unit can use at least two different register file mapping configurations for mapping the registers to execution threads; and the graphics processing system is configured to:

determine for a set of instructions to be executed for a set of threads in the programmable execution unit of the graphics processing unit, which of the at least two different register file mapping configurations to use for the set of instructions for the set of threads; and to:

cause the graphics processing unit to use the registers according to the determined register file mapping configuration when executing the set of instructions for the set of threads.

The technology described herein relates to the allocation of registers to execution threads when executing shader programs in a graphics processing unit. In the technology described herein, two or more different register file mapping configurations are able to be used, and then one of those available register file mappings is selected for use for a given instruction or instructions for a given thread or threads to be executed.

As will be discussed further below, the Applicants have recognised that certain register file mappings may be advantageous for certain forms of data accesses. The technology described herein exploits this by allowing the register file mappings to be, effectively, configured, e.g., on an instruction-by-instruction, thread-by-thread and/or shader program-by-shader program, etc., basis, in use. This then means that a more optimal register file mapping configuration can be used for instructions and/or shader programs that are to be executed. This can then lead to more efficient (e.g. in terms of power use) accesses to the registers during execution of shader programs by the graphics processing unit.

The programmable execution unit can be any suitable and desired programmable execution unit that a graphics processing unit may contain. It should be operable to execute graphics shading programs to perform graphics processing operations. Thus the programmable execution unit will receive graphics threads to be executed, and execute appropriate graphics shading programs for those threads to generate the desired graphics output.

The programmable execution unit can execute any suitable and desired shader program. In one embodiment the programmable execution unit executes a fragment shader program (a program for executing fragment shading operations).

The program should (and in an embodiment does) produce some useful output data, e.g. graphics processing output data for use in (subsequent) graphics processing operations, such as (an array of) vertex data, (an array of) fragment data etc. Thus, in an embodiment, the programmable execution unit executes a program so as to generate (an array of) graphics processing output data.

The generated output data may be further processed (in an embodiment for display), e.g. by a graphics processing pipeline, and/or provided to a display for display. Thus, in an embodiment, the generated output data is further processed, e.g. for display. In an embodiment, the generated output data is used to provide an image for display, e.g. is provided to a display for display.

There may be a single or plural programmable execution units. Where there are plural programmable execution units, in some embodiments each execution unit can operate in the manner of the technology described herein.

In an embodiment, the threads that are executed in the technology described herein are organised into thread groups, in which the threads of the group are executed in lockstep, one instruction at a time. (Other terms used for such thread groups include "warps" and "wavefronts". For convenience the term "thread group" will be used herein, but this is intended to encompass all equivalent terms and arrangements, unless otherwise indicated.)

The thread groups that are used in the technology described herein can be any suitable and desired size. In some embodiments each thread group contains four threads (i.e. there is a group width of four). In an embodiment each thread group (warp) corresponds to a 2×2 sampling position "quad". However, other arrangements, such as the use of wider thread groups (warps) would be possible, if desired.

The registers may be provided in any suitable and desired manner and there may be any suitable and desired number of registers. The registers are organised into at least two register banks. In one embodiment there are only two register banks, but in other embodiments there may be more than two register banks. Each register bank may comprise as many registers as are desired. In some embodiments each register bank is organised as, in effect, an array of registers, with, in some embodiments, there being sets of registers in the array that can be assigned (mapped) for use by respective execution threads.

In some embodiments, where execution threads can be organised into thread groups where the threads of one group are run in lockstep, one instruction at a time, each register bank contains one set of registers for each thread that a thread group can contain. Thus, for example, in one embodiment where the programmable execution unit can process thread groups comprising four execution threads, then each register bank contains four sets of registers, such that one set can be allocated to each thread in a thread group (if desired).

The different register file mapping configurations that can be selected between in the technology described herein can be selected as desired. In one embodiment there are two different register file mapping configurations that can be selected between. In other embodiments, there are more than two different register file mapping configurations (e.g. three register file mapping configurations).

In some embodiments the different register file mapping configurations are predefined, i.e. such that the system in use selects one of a plurality of predefined register file mapping configurations to use.

In some embodiments each register file mapping configuration is configured so as to be more optimal for a particular type of data access, and in some embodiments for use with data values having a particular, selected, size (precision). Thus, in an embodiment there is one register file configuration mapping that is intended for use for data values of a first size, and another register file mapping configuration that is intended for use with data values of a second, different size.

The data value sizes in this regard may be selected as desired, but in an embodiment correspond to data value sizes (e.g. data value precisions) that are likely to be used in the graphics processing system. Thus, in an embodiment, the data value sizes are at least two of: 16-bit, 32-bit and 64-bit data values. In an embodiment, there is one register file mapping configuration that is intended for use with 32-bit data values, and a second register file mapping configuration that is intended for use with 64-bit data values.

The register file mapping configurations can be made more optimal for use with, e.g., the particular data value size that they relate to, in any suitable and desired manner. In an embodiment, the register file mappings are configured so as to reduce the number of register banks that will need to be accessed by a thread or thread groups for data values of the size in question, and in an embodiment such that register accesses for data values of the size in question will access the minimum number of register banks (given the size of the register of register banks). In an embodiment the register file mappings are configured so that register accesses for data values of the size in question will only need to access one register bank (whereas data values of other sizes may require two or more of the register banks to be accessed to read or write those data values).

The register file mapping configurations can be organised in this regard in any suitable and desired way. This may depend, for example, on the size of data value that each individual register in the register banks can support.

In some embodiments, where the registers store a particular size of data value, e.g. and in an embodiment 32-bit data values, then there is one register file mapping configuration that is intended for use for this size of data value (e.g. and in an embodiment for 32-bit data values), in which the register file mapping maps respective registers from the same bank to each thread of a group of threads that may be processed as a thread group in the programmable execution unit, and a second register file mapping configuration that is intended for use with data values of twice the size (so, e.g. and in an embodiment, 64-bit data values) in which respective pairs of registers from the same register bank are allocated for use by a given execution thread (i.e. to thereby provide, in effect, for an execution thread, a pair of registers in the same register bank, such that the execution thread does not have to access two or more register banks when reading or writing the larger, e.g. 64-bit, data values). This allows all the threads in a thread group to make a register access in parallel by accessing just one bank of registers when using the smaller data values, and has the effect that the number of register banks that need to be accessed for a thread that uses the "larger" data values can be reduced.

The selected register file mapping configuration can be applied at any suitable and desired level of granularity (resolution) to and across the register banks. Thus, for example, it could be the case that all the registers and register banks are set to the selected register file mapping configuration (and in one embodiment this is what is done). In this case, all of the register banks will, accordingly, be mapped according to the register file mapping configuration that is selected.

Alternatively, it would be possible, if desired, to map a subset of the registers in the register banks to one of the register file mapping configurations, with other registers in the register banks being mapped to a different one (e.g. the other one) of the register file mapping configurations (and in an embodiment, this is done). In other words, different ones of the different register file mapping configurations could be used for different parts of the register file.

For example, a first subset of the registers could be configured to use one of the register file mapping configurations (e.g. that is optimised for 64-bit data values), with the remaining registers being configured according to the (or another) register file mapping configuration, such as, and in an embodiment, a configuration that is intended for use with 32-bit data values. This may be more appropriate where a shader program contains a mix of 32-bit and 64-bit operations.

In this case, as will be discussed further below, it may be possible to select which file mapping configuration to use on an instruction or instructions basis, whereas in the case where all the registers are configured to one of the register file mapping configurations, it may then be preferable to select the register file mapping configuration to use on a thread-by-thread or group of threads and/or shader program-by-shader program basis.

In the case where certain registers in the register banks are configured according to one of the register file mappings, with other registers being configured according to another of the register file mappings, then the number of registers that are configured according to the different register file mappings can be selected as desired, e.g. based upon the expected level of use of the different register file mappings. Correspondingly, the division of the registers into their respective register file mapping configuration subsets could be fixed, or could, e.g., be varied in use, e.g. depending upon the expected or actual use or need to use the different file mapping configurations.

The determination and selection of which file mapping configuration to use can be made at any suitable and desired level of granularity (resolution) in terms of instructions, and threads, etc. Thus, the set of instructions that the register file mapping configuration to use is selected for could contain a single instruction or plural instructions. Correspondingly, the set of threads that the register file mapping configuration to use is selected for could contain a single thread or plural threads. This may depend, for example, upon whether the selected register file mapping configuration is to be applied to all the registers that are to be used, or whether, as discussed above, different subsets of registers may use different register file mapping configurations.

In one embodiment, the determination and selection of the register file mapping configuration to use is made on an instruction-by-instruction or set of plural instructions-by-set of plural instructions basis. Thus, respective individual instructions or sets of plural instructions in a shader program to be executed will have the register file mapping configuration to use for those instructions determined and selected (with the instructions then using the registers according to the selected register file mapping configuration). This may be appropriate where, and is in an embodiment done where, different register file mapping configurations are used for different subsets of the available registers (as that then facilitates different instructions using registers configured to different register file mappings).

In this case therefore, instructions or sets of plural instructions in a shader program being executed are, in an embodiment, indicated as using registers having the appropriate register file mapping configuration for the form of the instructions in question. Thus, for example, and in an embodiment, instructions that use 32-bit data values are set to use registers configured according to a "32-bit data value" file mapping configuration, whereas instructions that use 64-bit data values are set to use registers that have a register file mapping configuration that is intended for 64-bit data values.

In another embodiment, the determination and selection of the register file mapping configuration to use is done for respective individual threads or sets of plural threads (e.g. thread groups) for which the shader program in question is to be executed. (In this case, the set of instructions that the register file mapping configuration is used for may be, and in an embodiment is, all the instructions in the shader program in question). This may be appropriate where the register file mapping configuration is applied globally (i.e. to all the available registers).

In this case, the register file mapping configuration is, in an embodiment, determined and selected (and then fixed) at least for a given thread group (warp) to be executed. It may also or instead be determined and selected (and then fixed) for higher levels of resolution than individual thread groups, such as for the shader program as a whole, for respective draw calls that a shader program is to be executed for, for respective render outputs being generated, etc. (and in other embodiments this is the case).

Thus, in embodiments, the register file mapping configuration is selected for the threads for which a shader program is to be executed, or for only a subset of the threads for which the shader program is to be executed (down to the level of individual thread groups that will execute in lock-step).

The determined (selected) register file mapping configuration to be used for a given shader program, execution thread or set of plural execution threads or instruction or set of plural instructions can be indicated (and the graphics processing unit can be caused to use the determined (selected) register file mapping configuration) in any suitable and desired manner, e.g. depending upon the level at which the register file mapping configuration is being selected and set.

Thus, for example, in the case of the register file mapping configuration being selected for individual instructions or sets of plural instructions, the configuration to be used for a given instruction or set of plural instructions can be, and in an embodiment is, indicated and set by configuring (setting) the instruction(s) to use the registers having the appropriate configuration (e.g. registers of the subset of registers that have the desired register file mapping configuration).

Where the determination and selection of the register file mapping configuration to use is done for execution threads or sets of plural execution threads or at a higher level, such as for a shader program as a whole, then the configuration to be used is, in an embodiment, indicated in and set using appropriate state information. Thus, it may be, and an embodiment is, indicated and set as part of the state for an execution thread or group of execution threads (e.g. as part of the thread group execution state), or as part of the render state for a draw call, shader program and/or render output to be generated, or as part of the overall graphics processing unit (pipeline) state (configuration).

In general, the register file mapping configuration should be indicated and set as a state configuration at the appropriate level for which the register file mapping configuration is being determined and selected.

The determination of which register file mapping configuration to use for a given instruction or set of plural instructions, thread or group of threads, shader program, etc., can be made at and by any suitable and desired component or element of the overall data processing system that the graphics processing unit is part of.

In one embodiment, the determination and selection is made based on the expected and/or anticipated use of the registers by the instruction or instructions, thread or threads and/or shader program in question, e.g., and in an embodiment, based on what form (size) of data values it is expected and/or can be predicted the relevant instruction or instructions, thread or threads, shader program, etc. will use.

In this arrangement, where, for example, it is expected that a shader program will have more instructions that will use data values of a particular form (precision), then in an embodiment the register file mapping configuration to use is selected accordingly. Correspondingly, if an instruction or set of plural instructions will use data values of a particular form (e.g. level of precision), then again in an embodiment that instruction or set of plural instructions is preferentially set to use registers that have the corresponding or appropriate register file mapping configuration for the data values in question.

In an embodiment of these arrangements of the technology described herein, the compiler for the programmable shading stage operates to determine and select the register mapping configuration to be used. The compiler is an appropriate element of the overall data processing system for doing this, as it is, e.g., able to analyse the shader program and/or shader program instructions to determine, e.g., which form (e.g. precision) of data values are being used (or will more predominantly be used), and thus select and set the register file mapping configuration accordingly.

Thus, in an embodiment, the compiler analyses the shader program code that is provided, e.g. by the application on the host processor that requires the graphics processing, and determines therefrom which register file mapping configuration to use.

The compiler could make the determination and selection of the register file mapping configuration to use for a shader program as a whole (and in one embodiment this is what is done). In this arrangement, the compiler will, and in an embodiment does, assess the data value precision that the instructions in the shader program will use, and select and set the register file mapping configuration accordingly. Thus, in an embodiment, the compiler will consider whether a shader program to be executed has a majority of 32-bit or 64-bit instructions, and then set the register file mapping configuration to be used for the shader program accordingly.

In another embodiment, the compiler can also or instead consider individual instructions or sets of plural instructions and then set the register file mapping configuration for the instruction or set of plural instructions in question accordingly. In this case, the compiler, in an embodiment, considers the precision of the data values that the instruction or set of plural instructions will use, and selects and sets the register configuration for the instruction or set of plural instructions accordingly. Thus, in an embodiment, the compiler will determine whether instructions in a shader program to be executed are 32-bit or 64-bit instructions (use 32-bit or 64-bit data values), and then set the register file mapping configuration to be used for those instructions accordingly, e.g., and in an embodiment, by setting the instructions to use registers that have the appropriate register file mapping configuration.

The compiler may, e.g., and in an embodiment does, run on a host processor of the overall data processing system that includes the graphics processing pipeline (with the graphics processing pipeline then being on another processor, such as a graphics processor, that is associated with the host processor (such that the compiler and compiled code run on separate processors within the overall data graphics processing system)). However, other arrangements would be possible, such as the compiler running on the same processor as the compiled code, or the compiler being run on a (completely) separate processor, such as the program being precompiled on a separate system and being distributed in a compiled form.

The technology described herein also extends to the compiler itself.

Thus, another embodiment of the technology described herein comprises a compiler that compiles programs to generate instructions for a programmable execution unit of a graphics processing pipeline that executes instructions to perform graphics shading operations;

wherein the compiler is configured to, for a set of at least one instruction in a shader program to be executed by an execution unit of a graphics processing unit:

determine which of at least two different register file mapping configurations that the graphics processing unit can use to use for the set of instructions; and cause the execution unit to use the registers according to the determined register file mapping configuration when executing the set of instructions.

Another embodiment of the technology described herein comprises a method of compiling a program to generate instructions for a programmable execution unit of a graphics processing pipeline that executes instructions to perform graphics shading operations;

the method comprising:

determining, for a set of at least one instruction in a shader program to be executed by an execution unit of a graphics processing unit, which of at least two different register file mapping configurations that the graphics processing unit can use to use for the set of instructions; and causing the execution unit to use the registers according to the determined register file mapping configuration when executing the set of instructions.

As will be appreciated by those skilled in the art, these embodiments of the technology described herein can and in an embodiment do include any one or more or all of the features of the technology described herein described herein, as appropriate. Thus, for example, in an embodiment the determination of which register file mapping configuration to use and the causing of the execution unit to use that configuration is done in one of the manners discussed above.

In another embodiment, the register file mapping to use is determined and selected based on analysis of the actual register use that is being made by execution threads when executing the shader program. This may be in addition to or instead of determining and selecting the register file mapping configuration to use based on a "prediction" of how the shader program will use the registers. For example, before the shader program is executed the register file mapping configuration could be selected based on an assessment of the shader program, e.g. by the compiler, with that register file mapping configuration then being able to (and in an embodiment being) changed and/or adjusted (if necessary) based on an analysis of the actual register use while the shader program is being executed.

Thus, in an embodiment, the use of registers by threads that are executing the shader program is monitored and/or tracked, and then used to determine (and, if necessary, set (change)) the register file mapping configuration that is used for later threads or groups of threads for which the shader program is executed. This will then allow the register file mapping configuration to be adjusted dynamically, in use, based on a measure of the dynamic behaviour and register use as the shader program is being executed.

In this case, any appropriate, suitable and desired run time statistics and performance counter measures, for example, could be used to control the register file mapping configuration that is used as the shader program is being executed. (In an embodiment, the register file mapping configuration is kept static for a given thread group that is being processed (i.e. is only able to be adjusted between respective thread groups, rather than while the shader program is being executed for a given thread group).)

In an embodiment processing circuitry of the data processing system, such as driver processing circuitry (a driver), issues the program to the programmable execution unit. In an embodiment, processing circuitry of the execution pipeline, in an embodiment, execution thread issuing circuitry, such as thread spawning circuitry and/or scheduling circuitry (a thread spawner and/or scheduler) issues the execution threads to the programmable execution unit. The operation in the manner of the technology described herein to determine the register file mapping configuration to use could be done for some but not all, e.g. for selected, shader programs, but in embodiment is done for each and every shader program that is to be executed by the graphics processing unit.

As will be appreciated by those skilled in the art, the graphics processing unit of the technology described herein will be part of an overall graphics processing system that will include, e.g., and in an embodiment, a host processor that, e.g., executes applications that require graphics processing by the graphics processing unit. The host processor will send appropriate commands and data to the graphics processing unit to control it to perform graphics processing operations and to produce graphics processing (render) output required by applications executing on the host processor. To facilitate this, the host processor should, and in an embodiment does, also execute a driver for the graphics processing unit and a compiler or compilers for compiling shader programs to be executed by the programmable execution unit of the graphics processing unit.

The graphics processing unit may also comprise, and/or be in communication with, one or more memories and/or memory devices that store the data described herein, and/or the output data generated by the graphics processing unit, and/or store software for performing the processes described herein. The graphics processing unit may also be in communication with a host microprocessor, and/or with a display for displaying images based on the data generated by the graphics processing unit.

The programmable execution unit(s) of the graphics processing unit may, and in an embodiment does, function (operate) as (the graphics processing pipeline may include) any suitable and desired graphics processing shader stage (shaders), such as a vertex shader, a geometry shader, fragment shader, etc. In an embodiment it can operate as each of these shaders.

The programmable execution unit of the graphics processing unit may comprise any suitable programmable hardware element such as programmable processing circuitry. Each programmable processing stage may be provided as a separate circuit element to other programmable stages of the processing pipeline or the programmable processing stages may share some or all of their programmable processing circuitry (that is then differently programmed to serve as the desired programmable processing stage).

As well as any programmable processing (shader) stages, the graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. In an embodiment the output, e.g. fragment shaded, data values from the graphics processing are exported to external, e.g. main, memory, for storage and use, such as to a frame buffer for a display.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or a display for displaying images based on the data generated by the graphics processor.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be comprised as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

Figure 2:
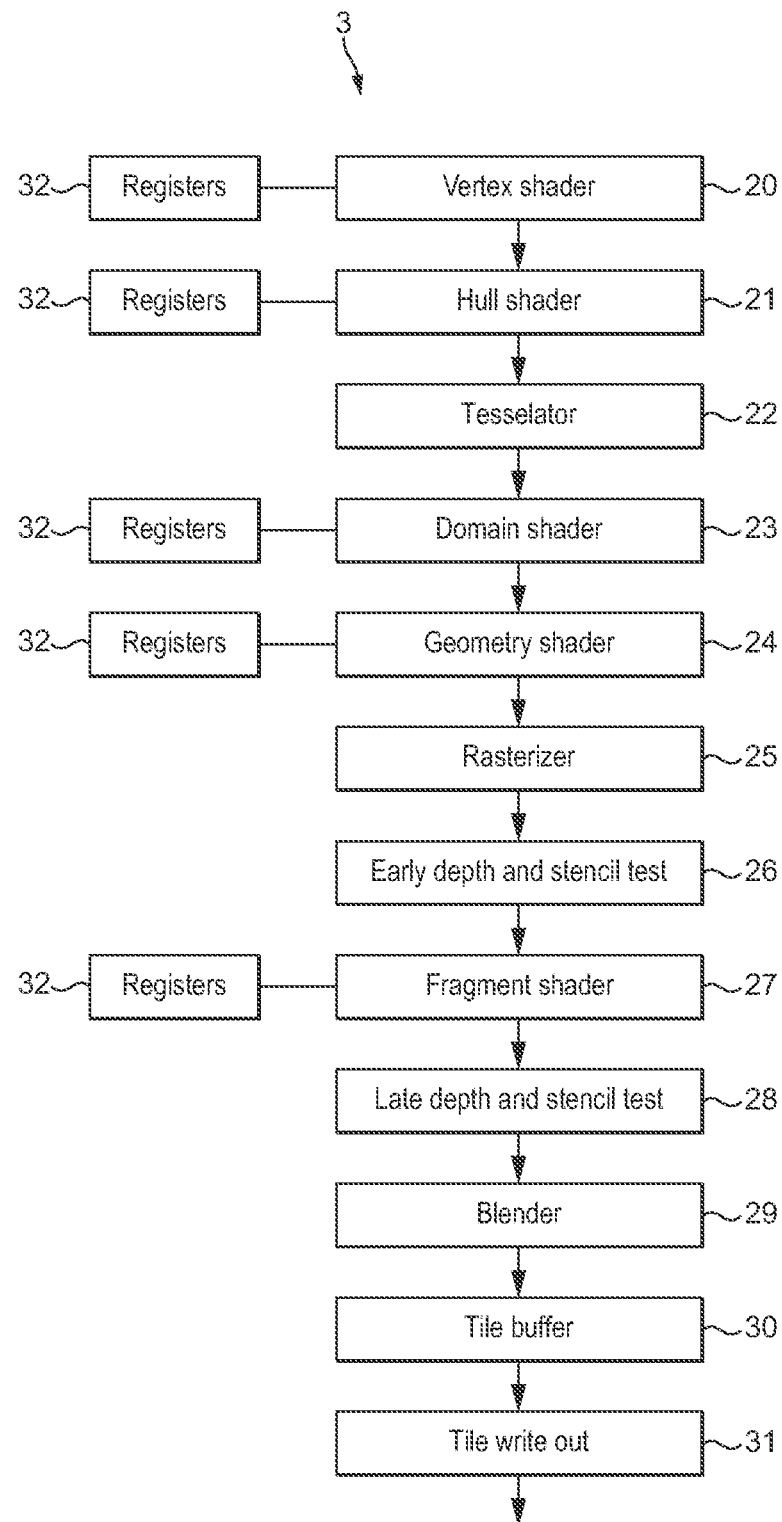
FIG. 2 shows schematically a graphics processing pipeline that can be operated in the manner of the technology described herein.

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and write out unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Each shader stage 20, 21, 23, 24, 27 has associated with it a set of registers 32 from which data for the respective shading stages 20, 21, 23, 24, 27 can be read.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include, as is known in the art, the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application. The driver will then issue the compiled program(s) to the graphics processing pipeline 3 for execution by the programmable processing stage(s) of the graphics processing pipeline.)

FIG. 2 shows schematically the operation stages of the graphics processing unit 3.

Figure 3:
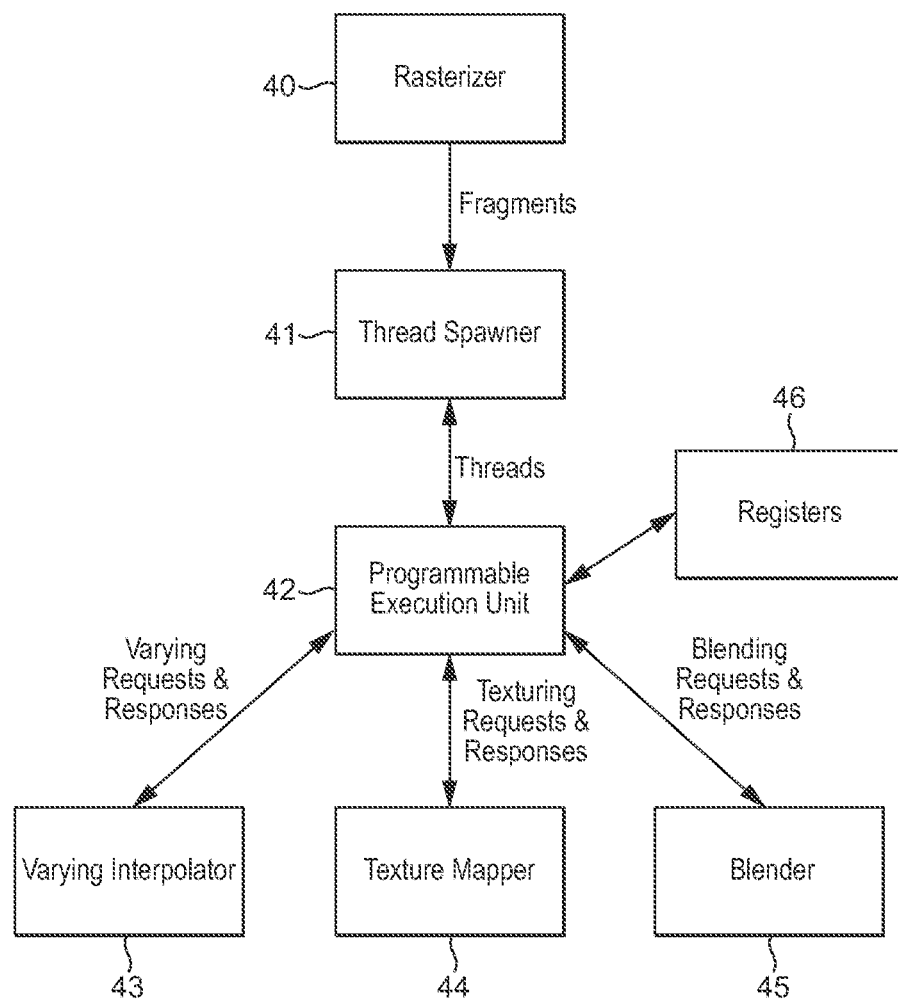
FIG. 3 shows schematically a graphics processing unit.

FIG. 3 shows the corresponding functional units of the graphics processing unit 3 that are used to perform (and thus to act as) various ones of the processing operations and stages of the graphics processing pipeline shown in FIG. 2. (There may be other functional units in the graphics processing unit 3. FIG. 3 shows those functional units that are relevant to operation in the manner of the technology described herein only for simplicity.)

As shown in FIG. 3, the graphics processing unit 3 includes a rasteriser 40, a thread spawner 41, a programmable execution unit 42, a varying interpolator 43, a texture mapper 44, a blender 45, and a set of registers 46.

The thread spawner 41 is operable to spawn execution threads for execution by the programmable execution unit 42, e.g. for fragments that it receives from the rasteriser 40 It may include execution thread issuing circuitry, such as a scheduler (scheduling circuitry), for issuing and to control the issue of threads for execution by the programmable execution unit.

The programmable execution unit 42 operates to execute shader programs to perform the shader operations of the graphics processing pipeline, such as the hull shader, the vertex shader and the fragment shader. To do this, it receives execution threads from the thread spawner 41 and executes the relevant shader program for those execution threads.

As part of this processing, and as shown in FIG. 3, the programmable execution unit 42 can call upon the varying interpolator 43, the texture mapper 44 and the blender 45 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 43 operates to interpolate values across graphics primitives, and, as part of this operation, often creates texture coordinates to be used for sampling graphics textures.

The texture mapper 44 operates to sample graphics textures using texture coordinates, e.g. generated by the varying interpolator 43, and produces therefrom a filtered texture sample result (which it can then return to the programmable execution unit 42 for use, e.g. when shading sampling points).

The blender 45 operates to blend, e.g., fragment shading results generated by the programmable execution unit 42 with previously generated fragment shader results, such as results that are already stored in the tile buffer and/or the frame buffer.

As discussed above, the programmable execution unit 42 will process and execute a given shader program to be executed for execution threads that it receives from the thread spawner 41 to perform graphics processing operations. As part of this operation, and as shown in FIG. 3, the execution threads will read data from and write data to respective registers 46.

Figure 4:
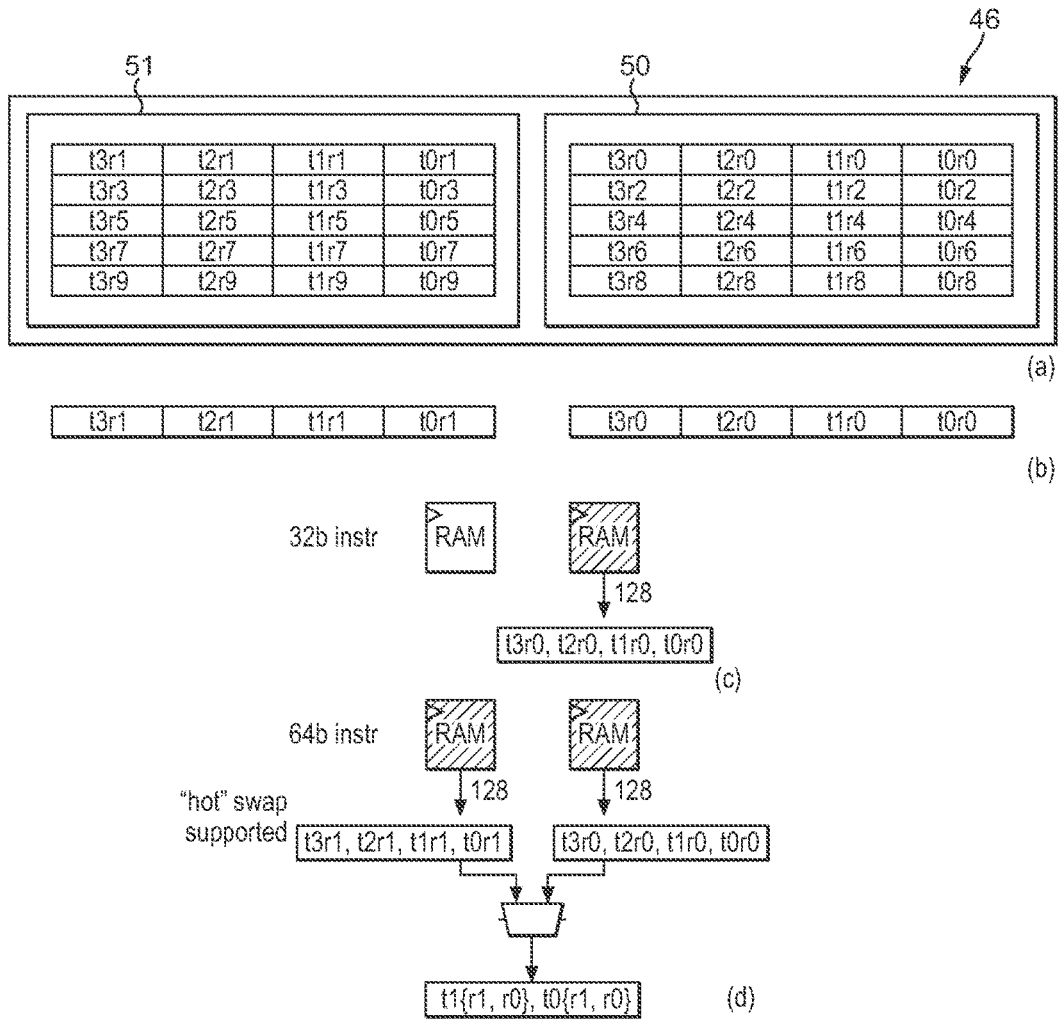
FIG. 4 shows schematically a first register file mapping configuration of an embodiment of the technology described herein.
Figure 5:
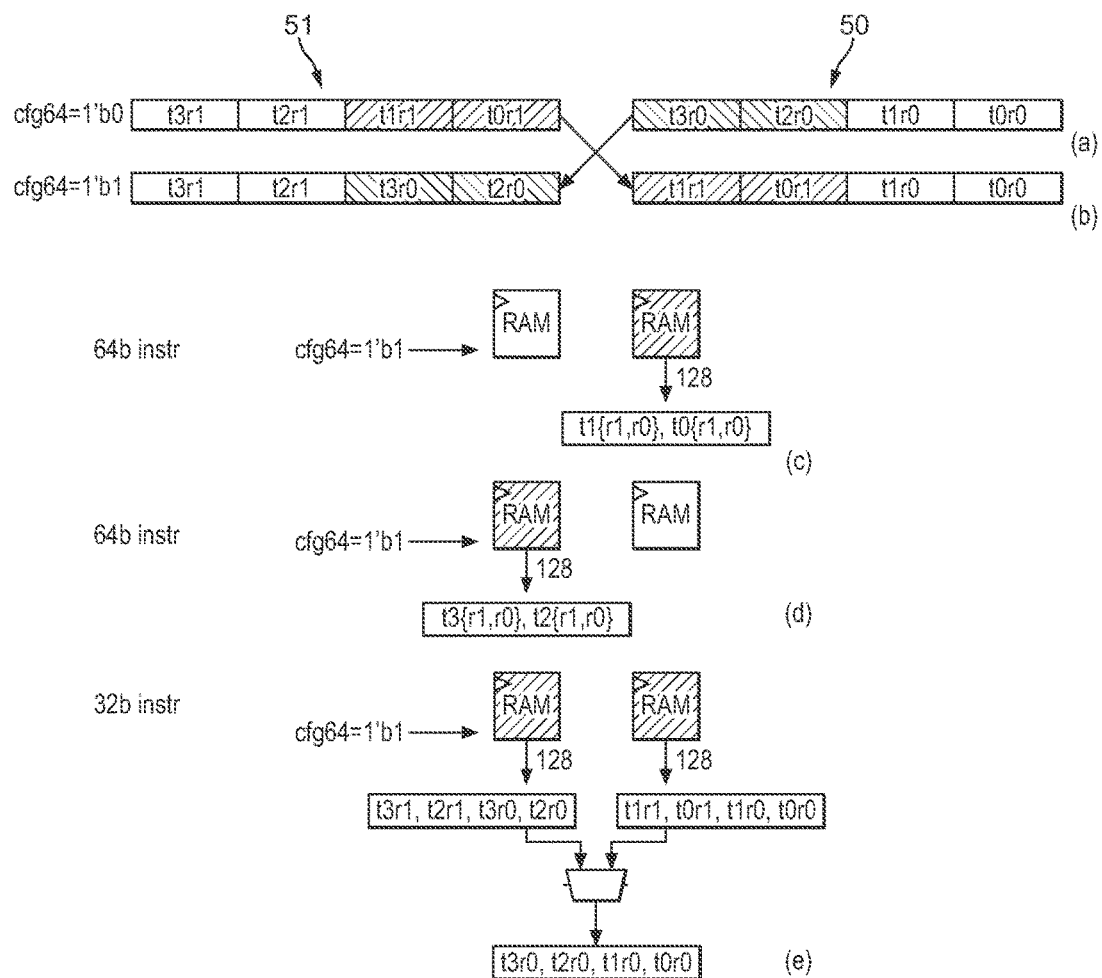
FIG. 5 shows schematically a second register file mapping configuration of an embodiment of the technology described herein.
Figure 6:
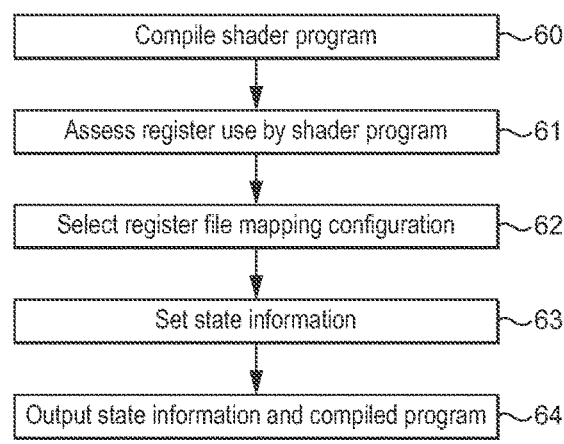
FIG. 6 shows schematically the operation of the compiler in one embodiment of the technology described herein.
Figure 7:
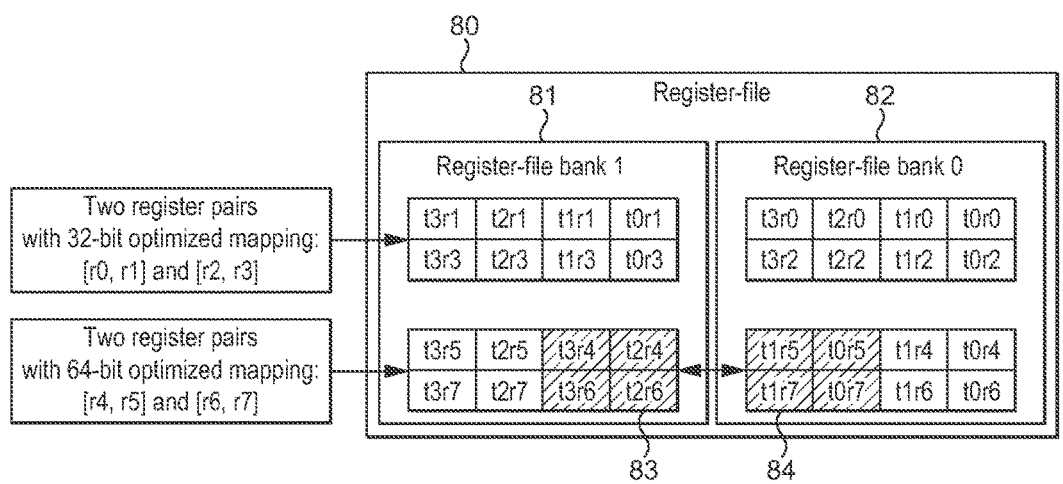
FIG. 7 shows schematically a third register file mapping configuration of an embodiment of the technology described herein.

An embodiment for mapping execution threads to the registers 46 will now be described with reference to FIGS. 4 to 7. FIGS. 4 and 5 show two register file mapping configurations that are used in embodiments of the technology described herein. FIGS. 6 and 7 show embodiments of the operation of the compiler to set the register file mapping configuration that will be used when a shader program is being executed.

In these embodiments, it is assumed that the programmable execution unit 42 executes execution threads in groups of four threads. Other arrangements would, of course, be possible.

As shown in FIG. 4A, in the present embodiment, the registers 46 are divided into two sub-banks, one bank for even registers 50, and one bank for odd registers 51. In the present embodiments, each register can store a 32-bit data value.

FIG. 4 shows a first predefined register file mapping configuration that is intended for, and made more optimal for, use with 32-bit data values.

In this configuration, as shown in FIG. 4, the registers of each register bank 50, 51 are divided into four subsets, one for each thread that will be part of the four-thread thread group that the programmable execution unit 42 will be processing. (In FIGS. 4 and 5, the notation tjri indicates register i of thread j (e.g. t0r1 indicates register 1 of thread 0.)

It can be seen from FIG. 4A, that with this register file mapping configuration, the four threads of a thread group can make 32-bit accesses to the registers in parallel by accessing just one of the register banks.

FIGS. 4B and 4C show this, and illustrate the data needed for accessing 32-bit registers r1, r0 of threads t0, t1, t2 and t3.

FIG. 4D shows for comparison purposes how 64-bit data values would be accessed using this register file mapping configuration. In this case, the 64-bit data values are stored using both an odd and an even register (e.g. r0 and r1) to form a 64-bit register. This then has the effect that to access a 64-bit data value for a thread using the register file mapping configuration of FIG. 4, both register banks 50, 51 would need to be accessed in parallel (as shown in FIG. 4D).

FIG. 5 shows a second register file mapping configuration that is used in the present embodiment, and which, in contrast to the register file mapping configuration of FIG. 4, is intended for (and made more optimal for) accessing 64-bit data values.

FIG. 5A shows again for comparison purposes the arrangement shown in FIG. 4 where 64-bit data values would be stored across the two register banks. FIG. 5B then shows the second register file mapping configuration that is optimised for use with 64-bit data values (for 64-bit mode (cfg64=1)).

In this configuration, as shown in FIG. 5B, words [127: 64] of one register bank 50 are, in effect, crossed with words [63:0] of the other register bank 51. This then means that just one of the register banks needs to be accessed for a given 64-bit thread that is executing, rather than two banks needing to be accessed (as would be the case with the register file mapping configuration shown in FIG. 4). This makes the access to the register banks more energy efficient.

This is illustrated in FIG. 5C and FIG. 5D. FIG. 5C shows the access to the 64-bit register (r1, r0) for threads t0, t1 and FIG. 5D shows the corresponding access for threads t2, t3. As can be seen, in each case just one bank is accessed for the two 64-bit threads that are executing.

FIG. 5E shows for comparison purposes how 32-bit threads would access the registers using the register file mapping configuration of FIG. 5. In this case, as shown in FIG. 5E, for a given thread group to access all the data values when operating using 32-bit instructions, both register banks would need to be accessed.

Thus, FIG. 4 shows a first register file mapping configuration that is more suited for use for 32-bit data accesses, whereas FIG. 5 shows a register file mapping configuration that is more suited for 64-bit data value accesses. The embodiments of the technology described herein operate to select which of these two register file mapping configurations to use, at any given time, so as to improve the energy efficiency of the register use when a shader program is being executed.

FIG. 6 shows a first embodiment for selecting which register file mapping configuration to use. In this embodiment, the register file mapping to use is selected for the shader program as a whole.

As shown in FIG. 6, the compiler will compile the shader program (step 60) and as part of that process will consider how the registers will be being used by the shader program (step 61). In the present embodiment, to do this the compiler simply determines whether there are some more 32-bit or 64-bit instructions in the shader program. Other arrangements would, of course, be possible.

The compiler then selects the register file mapping configuration to use for the shader program based on its assessment of the register use by the shader program (step 62). In the present embodiment, if the compiler determines that the shader program has more 32-bit instructions, then it selects the 32-bit register file mapping configuration (i.e. the configuration shown in FIG. 4) to be used for the shader program, and vice-versa.

The compiler then sets appropriate state information, such as the GPU state and/or the render state for the shader program, to indicate which register file mapping configuration should be used when executing the shader program. Finally, the compiled program and state information is output to the graphics processing unit (step 64).

In response to this, when the shader program is executed, the state information will cause the threads being executed by the programmable execution unit to use the registers according to the selected register file mapping configuration.

FIGS. 4 and 5 show arrangements in which the register file mapping configuration is set for the registers 46 as a whole. However, it would be possible to use different ones of the configurations shown in FIGS. 4 and 5 for different parts of the register file. For example, a first subset of registers (e.g. registers r0-r3, could use the 32-bit mode configuration, with the remaining registers using the 64-bit mode configuration (or vice-versa)). This may be beneficial where a shader program contains a mix of 32-bit and 64-bit operations, as this may then allow the use of the "64-bit" register subset to hold fp64 temporaries, with the remaining registers then preferentially being used to hold fp16/32 temporaries, memory addresses and other non-fp64 data.

FIG. 7 shows an example of such a "divided" register bank arrangement 80. In this arrangement, a first subset of registers 81 uses the 32-bit mode configuration, and a second subset of registers 82 uses the 64-bit mode configuration). The first set of registers 81 contains registers r0 to r3, and the second set of registers 82 contains registers r4 to r7. For the 64-bit-mode configuration, the sub-registers 83, 84 whose placements differ from the 32-bit configuration are shaded in grey.

Figure 8:
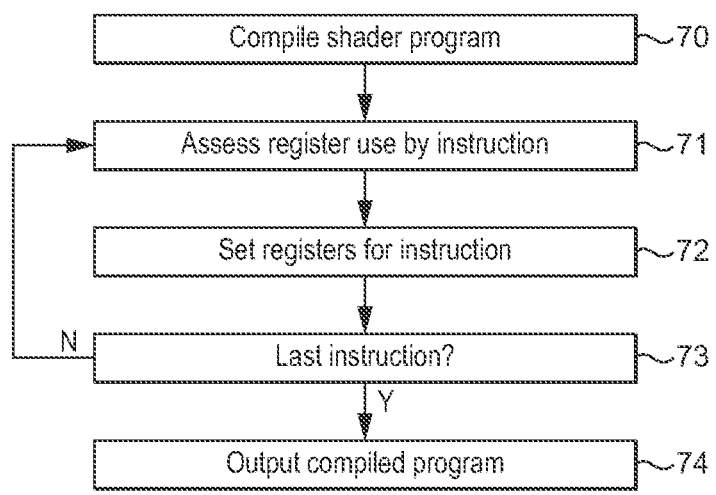
FIG. 8 shows schematically the operation of the compiler in another embodiment of the technology described herein.

FIG. 8 shows an embodiment of the compiler operation where different subsets of registers in the register banks use the different configurations of FIGS. 4 and 5.

As shown in FIG. 8, again the compiler will compile the shader program (step 70), but as part of this process it will consider the register use that will be made by each instruction in the shader program (step 71). To do this, the compiler will consider whether the instruction in question performs 64-bit operations (uses 64-bit data values) or doesn't perform 64-bit operations (e.g. performs 16 or 32-bit operations).

The compiler will then set the instruction to use the registers that have the configuration appropriate to the operation that the instruction performs (to the data values that the instruction uses) (step 72). Thus, for example, where it is determined that the instruction is to perform a 64-bit operation, the registers for the instruction that the compiler sets the instruction to use will (preferentially) be registers that are configured according to the 64-bit register file mapping configuration.

This is then repeated for each instruction (step 73) and then the final compiled program is output (step 74).

Then, when the programmable execution unit 42 executes the shader program, as each instruction is executed, that instruction will use the registers that it has been set to use by the compiler.

The Applicants have recognised that it may be the case that in these arrangements, depending upon the shader program, it may be that there are not enough registers to allocate the preferred registers to all the instructions in the shader program. In that case, once all the registers of the preferred configuration have been used, any further instructions that would preferentially use those registers are instead configured to use other registers. This should still have the benefit that for at least some of the instructions, more efficient register accesses will be performed.

Various alternative modifications and/or additions to the above embodiments would be possible, if desired. For example, the register configuration to use could, instead of being set for a shader program as a whole, be set for respective sets of instructions, and/or for respective sets of thread groups to be executed.

Also, as well as or instead of the compiler determining which register file mapping configuration to use, it would also be possible to track the use of registers as a shader program is being executed, and then use that information to set the register file mapping configuration to be used for later threads or groups of threads for which the shader program is being executed. Any appropriate runtime statistics could be used in this regard.

It can be seen from the above that the technology described herein, in its embodiments at least, facilitates more energy efficient accesses to registers when executing a shader program. This is achieved, in embodiments of the technology described herein at least, by selecting an appropriate register file mapping configuration to use for the shader program, thread groups, and/or instructions, based on an assessment of the register use that the shader program, threads groups, and/or instructions will make.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing unit that includes a programmable execution unit that executes program instructions to perform graphics shading operations, and a plurality of registers, distributed across at least two register banks, for use by execution threads being executed by the programmable execution unit; and wherein:

the graphics processing unit can use at least two different register file mapping configurations for mapping the registers of the register banks to execution threads in a group of execution threads that are being processed in lockstep as a thread group in the programmable execution unit;

the method comprising:

determining for a set of instructions to be executed for a group of threads being processed in lockstep as a thread group in the programmable execution unit of the graphics processing unit, which of the at least two different register file mapping configurations to use for the set of instructions for the group of threads; and using the registers according to the determined register file mapping configuration when executing the set of instructions for the group of threads being processed in lockstep as a thread group;

wherein the registers of the register banks store a particular size of data value;

wherein a first register file mapping configuration of the at least two different register file mapping configurations is configured for use for that particular size of data value, and such that the first register file mapping maps respective registers from the same bank to each thread of a group of threads that are being processed in lockstep as a thread group in the programmable execution unit;

wherein a second register file mapping configuration of the at least two different register file mapping configurations is configured for use with data values of twice that particular size and such that respective pairs of registers from the same register bank are allocated for use by an execution thread of a group of threads being processed in lockstep as a thread group.

2. The method of claim 1, wherein the register file mappings are configured so that register accesses for data values of the size that the register file mapping configuration is configured for use with will only need to access one register bank.

3. The method of claim 1, wherein:

a subset of the registers in the register banks are configured according to one of the register file mapping configurations, and other registers in the register banks are configured according to another one of the register file mapping configurations.

4. The method of claim 1, wherein:

the determination and selection of the register file mapping configuration to use is made on an instruction-by-instruction or set of plural instructions-by-set of plural instructions basis.

5. The method of claim 1, wherein:

the determination and selection of the register file mapping configuration to use is done for sets of plural threads for which a shader program is to be executed.

6. The method of claim 1, comprising:

analysing a shader program to be executed by the programmable execution unit, and determining therefrom which register file mapping configuration to use.

7. The method of claim 1, wherein:

determining for a set of instructions to be executed for a group of threads in the programmable execution unit of the graphics processing unit, which of the at least two different register file mapping configurations to use for the set of instructions for the group of threads, comprises:

determining which of the at least two different register file mapping configurations to use for a set of threads based on the use of the registers by other execution threads as a shader program is being executed.

8. The method of claim 1, comprising:
monitoring the use of registers by execution threads that are executing a shader program in the programmable execution unit; and
determining which of the at least two different register file mapping configurations to use for later threads for which the shader program is executed based on the monitored use of registers by execution threads that are executing the shader program.

9. A method of compiling a program to generate instructions for a programmable execution unit of a graphics processing pipeline that executes instructions to perform graphics shading operations;
the method comprising:
determining, for a set of instructions in a shader program to be executed for a group of execution threads that are being processed in lockstep as a thread group by a programmable execution unit of a graphics processing unit, which of at least two different register file mapping configurations that the graphics processing unit can use to use for the set of instructions; and
causing the execution unit to use the registers according to the determined register file mapping configuration when executing the set of instructions for the group of threads being processed in lockstep as a thread group;
wherein the registers are distributed across at least two register banks and wherein the registers of the register banks store a particular size of data value; and
wherein the at least two different register file mapping configurations from which the mapping can be selected comprise:
a first register file mapping configuration configured for use for that particular size of data value, and which first register file mapping maps respective registers from the same bank to each thread of a group of threads that are being processed in lockstep as a thread group in the programmable execution unit; and
a second register file mapping configuration configured for use with data values of twice that particular size in which respective pairs of registers from the same register bank are allocated for use by an execution thread of a group of threads being processed in lockstep as a thread group.

10. A graphics processing system comprising:
a graphics processing unit comprising:
a programmable execution unit that executes program instructions to perform graphics shading operations; and
a plurality of registers, distributed across at least two register banks, for use by execution threads in a group of execution threads being executed in lockstep as a thread group by the programmable execution unit;
wherein:
the graphics processing unit can use at least two different register file mapping configurations for mapping the registers to execution threads;
the graphics processing system further comprising processing circuitry configured to:
determine for a set of instructions to be executed for a group of threads being processed in lockstep as a thread group in the programmable execution unit of the graphics processing unit, which of the at least two different register file mapping configurations to use for the set of instructions for the group of threads; and to:
cause the graphics processing unit to use the registers according to the determined register file mapping configuration when executing the set of instructions for the group of threads;
wherein the registers of the register banks store a particular size of data value;
wherein a first register file mapping configuration of the at least two different file register mapping configurations is configured for use for that particular size of data value, and such that the first register file mapping maps respective registers from the same bank to each thread of a group of threads that are being processed in lockstep as a thread group in the programmable execution unit; and
wherein a second register file mapping configuration of the at least two register file mapping configurations is configured for use with data values of twice that particular size and such that respective pairs of registers from the same register bank are allocated for use by an execution thread of a group of threads being processed in lockstep as a thread group.

11. The system of claim 10, wherein the register file mappings are configured so that register accesses for data values of the size that the register file mapping configuration is configured for use with will only need to access one register bank.

12. The system of claim 10, wherein:
a subset of the registers in the register banks are configured according to one of the register file mapping configurations, and other registers in the register banks are configured according to another one of the register file mapping configurations.

13. The system of claim 10, wherein:
the determination and selection of the register file mapping configuration to use is made on an instruction-by-instruction or set of plural instructions-by-set of plural instructions basis.

14. The system of claim 10, wherein:
the determination and selection of the register file mapping configuration to use is done for sets of plural threads for which a shader program is to be executed.

15. The system of claim 10, wherein the system includes processing circuitry configured to:
analyse a shader program to be executed by the programmable execution unit, and determine therefrom which register file mapping configuration to use.

16. The system of claim 10, wherein the system includes processing circuitry configured to:
determine for a set of instructions to be executed for a group of threads being processed as a thread group in the programmable execution unit of the graphics processing unit, which of the at least two different register file mapping configurations to use for the set of instructions for group set of threads, by:
determining which of the at least two different register file mapping configurations to use for a group of threads being processed as a thread group based on the use of the registers by other execution threads as a shader program is being executed.

17. The system of claim 10, wherein the system includes processing circuitry configured to:
monitor the use of registers by execution threads that are executing a shader program in the programmable execution unit; and
determine which of the at least two different register file mapping configurations to use for later threads for which the shader program is executed based on the monitored use of registers by execution threads that are executing the shader program.

18. A non-transitory computer readable storage medium storing computer software code which when executing on at least one processor performs a method of compiling a program to generate instructions for a programmable execution unit of a graphics processing pipeline that executes instructions to perform graphics shading operations;

the method comprising:
determining, for a set of instructions in a shader program to be executed for a group of execution threads being processed in lockstep as a thread group by a programmable execution unit of a graphics processing unit, which of at least two different register file mapping configurations that the graphics processing unit can use to use for the set of instructions; and
causing the execution unit to use the registers according to the determined register file mapping configuration when executing the set of instructions for the group of threads being processed in lockstep as a thread group;
wherein the registers are distributed across at least two register banks and wherein the registers of the register banks store a particular size of data value; and
wherein the at least two different register file mapping configurations from which the mapping can be selected comprise:
a first register file mapping configuration configured for use for that particular size of data value, in which the first register file mapping maps respective registers from the same bank to each thread of a group of threads that are being processed in lockstep as a thread group in the programmable execution unit; and
a second register file mapping configuration configured for use with data values of twice that particular size in which respective pairs of registers from the same register bank are allocated for use by an execution thread of a group of threads being processed in lockstep as a thread group.

19. A non-transitory computer readable storage medium storing computer software code which when executing on at least one processor performs a method of operating a graphics processing unit that includes a programmable execution unit that executes program instructions to perform graphics shading operations, and a plurality of registers, distributed across at least two register banks, for use by execution threads being executed by the programmable execution unit; and wherein:

the graphics processing unit can use at least two different register file mapping configurations for mapping the registers of the register banks to execution threads in a group of execution threads that are being processed in lockstep as a thread group in the programmable execution unit;

the method comprising:
determining for a set of instructions to be executed for a group of threads being processed in lockstep as a thread group in the programmable execution unit of the graphics processing unit, which of the at least two different register file mapping configurations to use for the set of instructions for the group of threads; and
using the registers according to the determined register file mapping configuration when executing the set of instructions for the group of threads being processed in lockstep as a thread group;
wherein the registers of the register banks store a particular size of data value;
wherein a first register file mapping configuration of the at least two different file register mapping configurations is configured for use for that particular size of data value, and such that the first register file mapping maps respective registers from the same bank to each thread of a group of threads that are being processed in lockstep as a thread group in the programmable execution unit; and
wherein a second register file mapping configuration of the at least two register file mapping configurations is configured for use with data values of twice that particular size and such that respective pairs of registers from the same register bank are allocated for use by an execution thread of a group of threads being processed in lockstep as a thread group.

* * * * *